US005546423A

United States Patent [19]

Sehier et al.

[11] Patent Number: 5,546,423

[45] Date of Patent: Aug. 13, 1996

[54] SPREAD SPECTRUM DIGITAL TRANSMISSION SYSTEM USING LOW-FREQUENCY PSEUDORANDOM ENCODING OF THE WANTED INFORMATION AND SPECTRUM SPREADING AND COMPRESSION METHOD USED IN A SYSTEM OF THIS KIND

[75] Inventors: Philippe Sehier, Levallois-Perret; Dominique Deprey, Courbevoie, both of France

[73] Assignee: Alcatel Telspace, Nanterre Cedex, France

[21] Appl. No.: 257,057

[22] Filed: Jun. 8, 1994

[30] Foreign Application Priority Data

Jun. 9, 1993 [FR] France .................................. 93 06936

[51] Int. Cl.[6] .................................................... H04B 15/00

[52] U.S. Cl. ............................................................. 375/206

[58] Field of Search .............................. 375/206; 370/18, 370/19, 21; 327/164

[56] References Cited

U.S. PATENT DOCUMENTS 4,685,132 8/1987 Bishop et al. .
4,972,474 11/1990 Sabin .
5,153,598 10/1992 Alves, Jr. ................................ 375/206
5,276,705 1/1994 Higgins ................................... 375/206
5,341,396 8/1994 Higgins et al. ......................... 375/206
5,377,226 12/1994 Davis ..................................... 375/206

FOREIGN PATENT DOCUMENTS 2110468 4/1978 Germany .
2233860 1/1991 United Kingdom .

*Primary Examiner*—Stephen Chin
*Assistant Examiner*—Huong Luu
*Attorney, Agent, or Firm*—Sughrue, Mion, Zinn, Macpeak & Seas

[57] ABSTRACT

A spread spectrum digital transmission system using low-frequency pseudorandom encoding of desired information, and a spectrum spreading and compression method used in such a system. In a transmitter in the system, each block of a digital signal to be transmitted is combined with a sample obtained from a low-frequency pseudorandom generator. The resulting various combinations are converted into orthogonal or quasi-orthogonal sequences which are modulated and transmitted to a receiver. The receiver demodulates the signal received and combines each sequence with a sample identical to that used for the low-frequency coding at the transmitter to recover the various blocks of the transmitted signal. Hence, low frequency spectrum spreading of a signal to be transmitted is achieved.

8 Claims, 2 Drawing Sheets

SPREAD SPECTRUM DIGITAL TRANSMISSION SYSTEM USING LOW-FREQUENCY PSEUDORANDOM ENCODING OF THE WANTED INFORMATION AND SPECTRUM SPREADING AND COMPRESSION METHOD USED IN A SYSTEM OF THIS KIND

BACKGROUND OF THE INVENTION

1. Field of the Invention

The field of the invention is that of modems for transmitting digital signals and especially spread spectrum modems. To be more precise, the present invention concerns a spread spectrum transmission system in which digital signals are transmitted between a transmitter and a receiver and spectrum spreading is achieved by pseudorandom encoding of the wanted information to be transmitted. The invention applies in particular to military applications in microwave telecommunications.

2. Description of the Related Art

In military applications spread spectrum operation is usually adopted for ECCM (Electronic Counter-Counter-Measures) and entails multiplying the wanted signal to be transmitted by a code called the spreading code or sequence obtained from a pseudorandom generator whose clock frequency is much higher than the maximal frequency of the wanted signal. The number of wanted information bits transmitted per Hz is therefore very small.

FIG. 1 shows a timing diagram explaining the principle of spectrum spreading by means of a spreading sequence.

SUMMARY OF THE INVENTION

A wanted signal SAT to be transmitted, in this example coded by two levels +1 and −1 in an NRZ code, is multiplied by a cyclic spreading sequence SE which is also coded on two levels. The signal resulting from this multiplication is the signal ST transmitted from the transmitter to a receiver after modulation. The transmission medium for the modulated signal ST is usually a microwave link. At the receiving end, after demodulation, multiplication of the received signal ST and the same spreading sequence SE (same phase and same frequency) reconstitutes the wanted signal SAT.

Spread spectrum transmission by means of a direct sequence is usually employed to enhance the discretion of the signal transmitted, to increase its resistance to ECM (Electronic CounterMeasures) jamming and to increase its resistance to fading.

The spreading gain is the ratio of the chip time to the bit time, the chip time representing the duration of a bit of the spreading sequence and the bit time that of the wanted signal. The higher the spreading gain the more suitable the signal transmitted for discrete transmission and therefore the more resistant such signal to ECM devices designed to detect and, possibly, jam it. An essential step of the ECM analysis is to determine the spreading random phase of the intercepted signal as this step makes it possible to penetrate the information content of the intercepted signal, i.e. to reconstitute the wanted signal.

The main drawback of direct sequence spread spectrum transmission is that the direct sequence generator must operate at the chip sending frequency, i.e. at a frequency in the order of several MHz. It is therefore necessary to implement this generator in an ASIC, which increases the complexity and the development cost of the hardware.

An object of the present invention is to remedy this drawback.

To be more precise, one object of the invention is to provide a spread spectrum system for transmitting a digital signal which does not require any spreading random phase generator operating at the chip frequency. It is therefore simpler to implement and less costly, whilst enabling significant spreading of the spectrum of the wanted signal in order to resist ECM devices.

Another object of the invention is to provide a system of this kind in which the spectrum spreading is effected by means of orthogonal sequences, for example using M-sequence type sequences (also known as maximal length sequences or Hadamard sequences) which are well known in the field of digital signal transmission.

An additional object is to provide a spread spectrum method of transmitting digital signals in which spectrum spreading is effected at the bit frequency and not at the chip frequency.

These objects, and others that emerge hereinafter, are achieved by virtue of a system for transmitting a digital signal between a transmitter and a receiver, characterized in that:

* the transmitter includes in succession:
  - coding means receiving the digital signal and supplying, for each block of k bits of the digital signal, a coded sample taking an integer value in the range [0, N−1], each integer value being representative of the k bits of the block from which it is obtained;
  - combining means for combining the coded samples with samples from a pseudorandom random phase generator, the combining means supplying an integer in the range [0, M−1] for each combination of a coded sample and a random phase sample from the random phase generator, M being greater than N;
  - signal generator means supplying, for each integer in the range [0, M−1], a sequence of integers corresponding to the integer, the various sequences being orthogonal or quasi-orthogonal;
  - transmit means for transmitting the sequences of g integers to the receiver, the transmit means comprising a phase shift modulator using M states;
* the receiver includes in succession:
  - receive means recovering the sequences of g integers;
  - processing means receiving the sequences of g integers from the receive means and random phase samples from a random phase generator synchronized with the random phase generator of the transmitter, the processing means demodulating the sequences of g integers and implementing an operation which is the inverse of that implemented by the combining means to recover the coded samples;
  - decoding means for recovering the digital signal from the samples supplied by the processing means. The M sequences of g integers are preferably Hadamard sequences.

BRIEF DESCRIPTION OF THE DRAWINGS

Other features and advantages of the invention will, emerge from the following description of one preferred embodiment of the invention given by way of non-illustrative example only and with reference to the appended drawings in which.

DETAILED DESCRIPTION OF THE PREFERRED EMBODIMENTS

Figure 1:
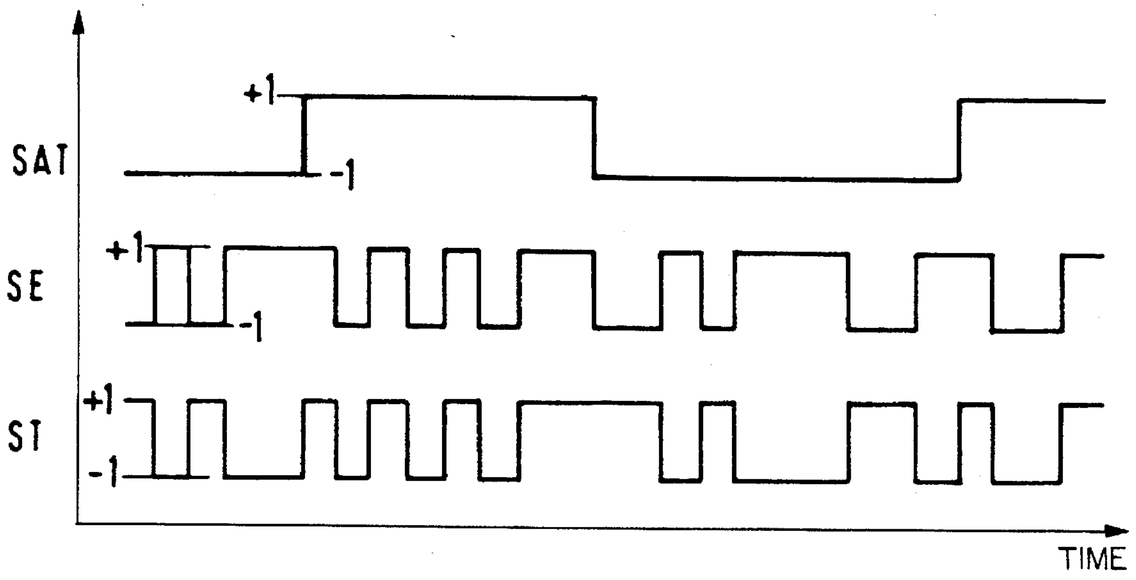
FIG. 1 shows a timing diagram explaining the principle of spectrum spreading by means of a spreading sequence.

FIG. 1 has been described already with reference to the prior art.

Figure 2:
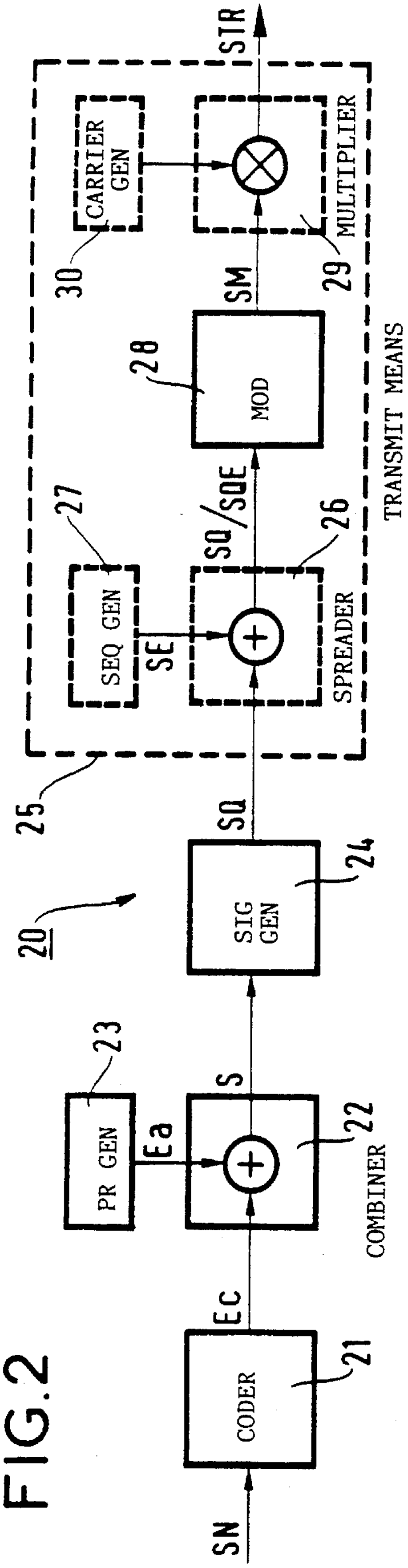
FIG. 2 is a block diagram of a transmitter of the transmission system of the present invention.

Referring to FIG. 2, the digital signal SN to be transmitted is applied, in this example through a serial port, to coding means 21 which supply, for each block of k bits of the signal SN, a coded sample $E_c$ taking an integer value from the set {0, . . . , N−1}, each integer value being representative of the k bits of the respective block. The coding means 21 can be a simple binary-decimal converter, for example, and the bit rate at the output of the coding means is then k times lower than the incoming bit rate.

The coding means 21 can also interleave the bits of the signal SN.

The coded samples $E_c$ are applied to means 22 for combining these samples with samples $E_a$ from a pseudorandom generator 23 referred to hereinafter as the random phase generator. The combination means 22 comprise a conversion algorithm which converts each coded sample $E_c$ into an integer s in the set {0, . . . , M−1} where M is an integer greater than N. We have:

$$s=f(E_c, E_a)$$

where f is any function taking its values in the set {0, . . . , M−1) and $E_a$ is a random phase sample.

The combining means 22 can be a simple modulo M adder, for example, as shown here, and supplying:

$$s = E_c \overset{M}{\oplus} E_a$$

where $$\overset{M}{\oplus}$$

denotes modulo M addition which can also be written:

$$s=(E_c+E_a) \bmod M$$

Apart from the fact that it can be implemented by a very simple algorithm, this modulo M addition achieves optimal resistance to ECM jamming.

Each integer s is then supplied to means 24 for generating signals supplying, for each integer s, a sequence SQ of g corresponding samples, each sample g being an integer. The signal generator means 24 converts each integer s into a series SQ, this conversion process being a one-to-one conversion, i.e. to a given integer s there corresponds a single sequence SQ, and vice versa.

We can write:

$$SQ=b_0^s b_1^s b_2^s \ldots b_{q-1}^s$$

where $b_i^s$ is an integer between 0 and L−1.

The signal generator can be a transcoding table, for example. Reference may usefully be had to French patent No 2 337 465 (COMPAGNIE IBM FRANCE™) which describes CAZAC sequences which are periodic pseudorandom sequences of complex numbers with a periodic autocorrelation function in which only the first coefficient is non-null and in which all the complex numbers have a constant amplitude. The generation of such sequences can be generalized to obtain orthogonal sequences of integers, i.e. sequences having optimal autocorrelation properties. Also relevant are Gold sequences which are quasar-orthogonal and Kasami sequences, as well as so-called polyphase sequences. In one preferred embodiment of the invention the means 24 generate sequences SQ which are substantially orthogonal. For example, the signal generator means 24 can convert each integer s into a series SQ of g bits (samples each taking a value in the set {0, 1}) as shown in table 1 below.

TABLE 1

| Value of input s | Generated sequence SQ |
|---|---|
| 0 | 0 0 0 0 0 0 0 |
| 1 | 1 1 1 0 1 0 0 |
| 2 | 0 1 1 1 0 1 0 |
| 3 | 0 0 1 1 1 0 1 |
| 4 | 1 0 0 1 1 1 0 |
| 5 | 0 1 0 0 1 1 1 |
| 6 | 1 0 1 0 0 1 1 |
| 7 | 1 1 0 1 0 0 1 |

In this configuration, M=8 and q=7. Each sequence of g bits is obtained by circular shifts in a maximal length sequence of length 7, except the first which is always made up of zeroes. These sequences have quasi-orthogonal properties, i.e. for any two different sequences the exclusive-OR sum of each term is equal to 4.

It is possible to generalize this principle of generating quasi-orthogonal signals SQ to any value of M which is a power of 2. To achieve this, after determining a maximal length sequence of period M−1 (by any of the methods well known in the field of digital signal processing), the M sequences of M−1 bits are obtained by circular shifting of the original sequence, except for the first which is always made up of zeroes.

A perfectly orthogonal class of sequences that can be used is the class of Hadamard sequences. Table 2 shows one example of these for samples also made up of bits.

TABLE 2

| Value of input s | Generated sequence SQ |
|---|---|
| 0 | 1 1 1 1 1 1 1 1 |
| 1 | 1 0 1 0 1 0 1 0 |
| 2 | 1 1 0 0 1 1 0 0 |
| 3 | 1 0 0 1 1 0 0 1 |
| 4 | 1 1 1 1 0 0 0 0 |
| 5 | 1 0 1 0 0 1 0 1 |
| 6 | 1 1 0 0 0 0 1 1 |
| 7 | 1 0 0 1 0 1 1 0 |

The length of these sequences is 8.

The above description shows that each block of k bits of the signal SN has been converted into a corresponding sequence SQ, each sequence SQ including a pseudorandom component. The wanted information is coded in this sequence SQ and the various sequences are orthogonal or quasi-orthogonal. Provided that M and g are large in comparison to k or N, this coding operation significantly increases the number of samples to be transmitted and the spectrum of the wanted signal SN has been spread using random phase data supplied at a low frequency.

The main advantage of the invention is precisely this coding at the bit frequency rather than at the chip frequency (when spectrum spreading is achieved by means of a direct sequence). The frequency at which the devices described so far operate can be very low, in the order of 16 kbit/s, as compared with 10 Mchips in the case of direct sequence spread spectrum.

The samples can take higher values, depending on the method of modulation used in the transmit means 25 to which the sequences SQ are supplied.

The transmit means 25 supply a signal STR transmitted to the receiver. They can be of any analog or digital type.

In the embodiment shown the transmit means 25 are digital and include a phase shift modulator 28. The modulator 28 is of the MPSK (Multiple Phase Shift Keying) type, for example, where in this example M represents the number of possible values of the samples g of the sequences SQ and thus the number of phase states of the modulated signal STR. It is possible to use BPSK modulation, for example, if the sequences SQ are exclusively made up of bits, QPSK modulation if the integers of the sequences SQ are all in the set {0, 1, 2, 3}, and 64-PSK modulation if the integers of the sequences SQ are all in the set {0, 1, . . . , 63}. The phase shift modulator 28 can equally well be of the QAM type. It supplies a modulated signal SM.

The transmit means 25 can also include spreading sequence spectrum spreading means 26. The spreading sequence SE is generated by a spreading sequence generator 27. In the embodiment shown it is assumed that the values of the bits of the sequences SA are in the set {0, 1} and that the values of the chips of the spreading sequence SE are also in the set {0 1}. Each sample $b_i^s$ produced by the signal generator means is added modulo L to G random phase values $e_s$ of the set {0, 1, . . . , L−1) and obtained from the generator 27, where G represents the direct sequence spreading gain. The increase in bit rate due to this processing is equal to G. In the case of direct sequence spectrum spreading it is the output signal SQE of the means 26 which is applied to the modulator 28.

Each sample $a_i$ of a sequence SQE takes has a value from the set {0, 1, . . . , L−1). If no direct sequence spreading is used, G=1 and $e_s$=0, i.e. this operator is transparent.

The signal STR transmitted to the receiver is of the form:

$$STR(t) = \sum_i g(\alpha_i) \cdot h_e(t - iTs) \quad (1)$$

where g is the mapping function implemented by the modulator 28, Ts is the symbol time and $h_e$(t-iTs) is the transmit filter. For example:

with BPSK modulation, L=2 and g(0)=−1 and g(1)=1

In this case equation (1) is written:

$$STR(t) = \sum_i (2\alpha_i - 1) \cdot h_e(t - iTs) \text{ with } \alpha_i = 0 \text{ or } 1$$

with QPSK modulation,
L=4 and g(0)=1, g(1)=j,
g(2)=−1 and g(3)=−j with 8PSK modulation, L=8 and g(k)=$e^{2jk\pi/8}$ More generally, for MPSK modulation, L=M and g(k)=$2^{jk\pi/M}$.

Note that the mapping function g of the modulator must conform to the equation:

$$g(x \overset{L}{\oplus} y) = g(x) \cdot g(y)$$

if direct sequence spreading is used (G>1).

The impulse response $h_e$ of the transmit filter is assumed to be such that:

$$-\int_{-\infty}^{+\infty} h_e^2(t)dt = 1$$

and $$-\int_{-\infty}^{+\infty} h_e(t) \cdot h_e(t + kT) = 0 \text{ for } k \neq 0 \text{ (Nyquist criterion).}$$

The direct sequence spreading means 26 are optional in the case of the invention and are therefore shown in dashed outline.

The transmission means 25 can also comprise frequency evasion means 29, 30, which are also optional and therefore shown in dashed outline, adapted to modify the carrier frequency of the signal transmitted to the receiver. Frequency evasion entails frequently changing the carrier frequency in order to spread further the spectrum of the signal transmitted to the receiver. The base band or intermediate frequency modulated signal SM is applied to a multiplier 29 receiving a carrier frequency signal from a generator 30.

The random phase generator 23 enables low-frequency coding of the signal to be transmitted and pseudorandom modification of the phase of the signal transmitted in the case of MPSK type modulation. The generator 23 and the combining means 22 can therefore be deemed to implement a low-frequency phase evasion function. Amplitude modulation, also pseudorandom, of the signal to transmit is combined with this phase evasion when the modulation is of the QAM type (which modifies the phase and amplitude of the signal transmitted). In this way the transmission system of the invention can achieve high resistance to ECM jamming.

Figure 3:
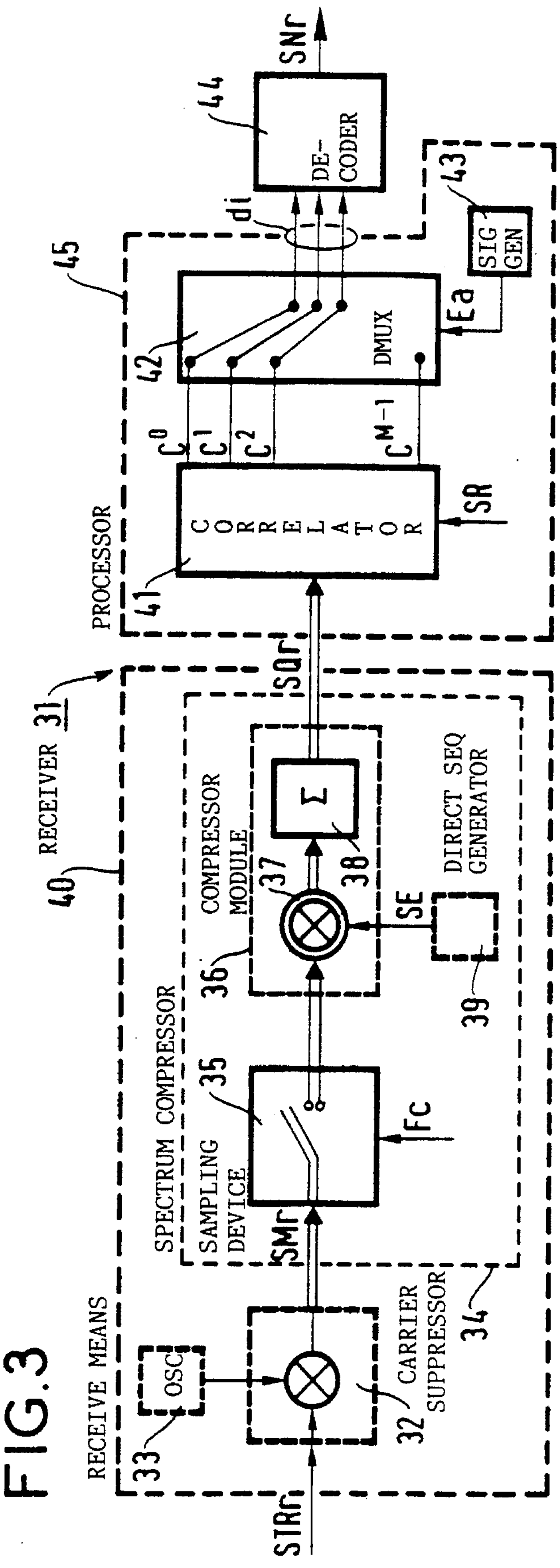
FIG. 3 is a block diagram of a receiver for digital signals transmitted by the transmitter of FIG. 2.

The output signal STR of the transmit means 28 is transmitted by microwave link to the receiver 31 whose block diagram is shown in FIG. 3.

The receiver 31 receives a signal STRr corresponding to the signal STR to which noise is added by the transmission medium. It includes receive means 40 restoring the sequences SQ of g integers, denoted SQr in the receiver. The receive means 40 in this example comprise means 32 for suppressing the carrier frequency under the control of a local oscillator 33. The means 32 conventionally comprise two mixers controlled by clock signals in phase quadrature and two signals in phase quadrature are obtained at the output of these means. When frequency evasion is used at the transmitter 20, the local oscillator 33 is synchronized to that 30 of the transmitter. This synchronization can be achieved by known means. The output signal SMr of the means 32 correspond to the signal SM at the transmitter.

The signal SMr is applied to spectrum compressing means 34 to cancel the direct sequence spectrum spreading applied at the transmitter 20, if any. Spectrum compression means are described in "Digital Communications" by J. G. PROAKIS, McGraw-Hill™, chapter 8, for example. Those shown in FIG. 3 comprise a sampling device 35 operating at the chip frequency Fc followed by a spectrum compression module 36. The module 36 includes a complex multiplier 37 followed by a summing device 38. The multiplier 37 receives a direct sequence SE from a generator 39. The direct sequence SE is identical to that generated by the generator 27 in the transmitter 20. The two direct sequences have their phase synchronized by known means.

The summing device 38 computes, for each block of G consecutive samples $r_k$ from the multiplier 37, the following sum:

$$U_k = \sum_{k=0}^{G-1} r_k \cdot g^*(e_{sk})$$

where $e_{sk}$ is the chip value at time k of the direct sequence SE and * denotes the conjugate complex. This summation eliminates the direct sequence spectrum spreading.

Each sum $U_k$ thus corresponds to one sample $\alpha_i$ of the signal STR transmitted to the receiver. At the output of the module 36 there are thus obtained sequences SQr identical to the sequences SQ produced by the signal generator means 24 in the transmitter 20.

These sequences SQr are applied to processing means 45 whose function is to demodulate the received signal and remove the random phase $E_a$ introduced in the transmitter 20 by the random phase generator 23.

In the embodiment shown the processing means 45 comprise correlator means 41 which compute, for each block of Q successive sums U, the following value:

$$C^s = \sum_{k=0}^{Q-1} U_k \cdot g^*(b_k^s)$$

for s=0 through M−1.

The correlator means 41 receive for this purpose a references signal SR constituted by the various sequences SQ which can be generated at the transmitter 20, for example those shown in tables 1 and 2. The benefit of generating orthogonal or quasi-orthogonal sequences by means of the generator 24 in FIG. 2 (rather than any sequences) is that it is easy to detect correlation between these signals.

The computed correlations yield sums $C^0$ to $C^{M-1}$ which each correspond to one of the integers from the combination means 22 of the transmitter 20. These sums are applied to a demultiplexer 42 receiving from a generator 43 a signal $E_a$ identical to and in phase with that generated by the generator 23 in the transmitter.

The demultiplexer 42 selects N sums $C^s$ from M according to the value of the phase $E_a$. Generally speaking, the demultiplexer 42 implements an inverse function $f^{-1}$ to eliminate the low-frequency random phase introduced on transmission.

For example, if the combining means 22 produce:

$$s = E_c \overset{M}{\oplus} E_a$$

then the demultiplexer 42 supplies at its output the signals:

$$d_i = C^{s} \underset{(E_a\ i)}{\overset{M}{\oplus}}$$

for i=0 through N−1 and $E_a$ from the set {0, 1, . . . , M−1}. The demultiplexer 42 therefore selects the samples $C^s$ according to the phase $E_a$.

Each sample $d_i$ therefore corresponds to a sample $E_c$ from the transmitter. These samples $d_i$ are then applied to decoder means which implement an operation inverse to that of the coding means 21 in the transmitter 20. They can also disinterleave the decoded samples if the coding means interleave the coded samples. The output signal SNr of the decoder means 44 then corresponds to the digital signal SN at the transmitter.

Of course, other means of implementing the processing means 45 are feasible. For example, it is possible to compute only the samples $d_i$ using the equation:

$$d_i = \sum_{k=0}^{Q-1} U_k \cdot g^*(b_k^{(E_a \overset{M}{\oplus} i)})$$

This direct computation dispenses with the fast correlation algorithm and therefore simplifies the practical implementation of the receiver. Only the wanted correlations are computed. The processing means 45 then comprise only correlator means such as the correlator means 41 receiving the signal $E_a$.

The present invention applies, for example, to transmission systems in which error corrector codes are used and a very large orthogonal signal alphabet, bigger than the alphabet used by the error corrector code, is available. The letters of the alphabet not used by the code can be used for pseudorandom coding at low-frequency of the signal to be transmitted, providing a low-cost means of increasing the resistance of the system to interception.

We claim:

1. A system for transmitting a digital signal (SN) between a transmitter (20) and a receiver (31), said transmitter 20 including in succession:

coding means (21) receiving said digital signal (SN) supplying, for each block of k bits of said digital signal (SN), a coded sample (Ec) taking an integer value in the range (0, N−1), each integer value Ec being representative of the k bits of the block from which it is obtained;

combining means (22) for combining said coded samples (Ec) with samples (Ea) from a pseudorandom random phase generator (23), said combining means (22) supplying an integer (s) in the range (0, M−1) for each combination of a coded sample (Ec) and a random phase sample (Ea) from said pseudorandom random phase generator (23), M being greater than N;

signal generator means (24) supplying, for each integer (s) in the range (0, M−1), a sequence (SQ) of g integers corresponding to said integer (s), the various sequences (SQ) being orthogonal or quasi-orthogonal; and transmit means (15) for transmitting said sequences (SQ) of g integers to said receiver (31), said transmit means (25) comprising a phase shift modulator using M states; and said receiver (31) including in succession:

receive means (40) recovering said sequences (SQ) of g integers as recovered sequences (SQr);

processing means (45) receiving said received sequences (SQr) of g integers from said receive means (40) and random phase samples (Ea) from a random phase generator (43) synchronized with said pseudorandom random phase generator (23) of said transmitter (20), said processing means (45) demodulating said received sequences (SQr) of g integers and implementing an operation which is the inverse of that implemented by said combining means (22) to recover coded samples (di); and decoding means (44) for recovering a digital signal (SNr) from said coded samples (di) supplied by said processing means (45).

2. A system according to claim 1 wherein said M sequences (SQ) of g integers are Hadamard sequences.

3. A system according to claim 1, wherein said transmit means (25) comprise spectrum spreading means (26, 27) using a spreading sequence (SE) and in that said receive means (40) comprise spectrum compression means (34) operating in synchronism with said spectrum spreading means (26, 27) of said transmit means (25).

4. A system according to claim 1, wherein said transmit means (25) comprise frequency evasion means (29, 30) adapted to modify the carrier frequency of said signal transmitted to said receiver (30) and in that said receive means (40) comprise means (32, 33) for implementing a function which is the inverse of that of said frequency evasion means (29, 30), adapted to eliminate said frequency evasion introduced at said transmitter (20).

5. A system according to claim 1, wherein said coding means (21) also interleaves the bits of said digital signal (SN) and in that said decoding means (44) also, disinterleaves the coded samples (di).

6. A system according to claim 1, wherein said combining means (22) of said transmitter (20) supplies, for each coded sample (Ec), an integer (s) equal to:

$$s = E_c \overset{M}{\oplus} E_a$$

where:

s is said integer supplied by said combining means (22);

$E_c$ is said coded sample;

$E_a$ is a random phase sample from said pseudorandom random phase generator (23) of said transmitter (20);

$$\overset{M}{\oplus}$$

denotes modulo M addition, where M is an integer; and in that said means for eliminating said random phase of said receiver (30) supply, for each sequence (SQe) of g bits from said processing means, an integer ($d_i$) equal to:

$$d_i = SQe\,(E_a \overset{M}{\oplus} i)$$

where $E_a$ is a random phase sample from said random phase generator (43) of said receiver (31).

7. A spread spectrum method of transmitting a digital signal between a transmitter (20) and a receiver (30) including the steps of:

at said transmitter (20):

generating, for each block of k bits of said digital signal, a coded sample (Ec) taking an integer value in the range (0, N−1), each integer value being representative of the k bits of the respective block;

combining said coded samples (Ec) with random phase samples (Ea) to generate an integer (S) in the range (0, M−1) for each combination of a coded sample (Ec) and a random phase sample (Ea), M being greater than N;

generating for each integer (s) in the range (0, M−1) a sequence (SQ) of g integers, by means of a one-to-one conversion process, the sequences SQ being orthogonal or quasi-orthogonal;

transmitting said sequences (SQ) of g integers to said receiver (30);

at said receiver (30):

recovering said sequences SQ of g integers as recovered sequences (SQr) from the signal received from said transmitter (20) and, for each said recovered sequence (SQr) of g integers recovered, generating an integer by performing a conversion which is the inverse of said one-to-one conversion process carried out at said transmitter (20);

combining each integer generated with a random phase sample (Ea) identical to that used to obtain said integer at said transmitter (20), so as to recover a corresponding coded sample (di) and to eliminate said random phase sample (Ea);

decoding each coded sample (di) to recover a digital signal (SNr).

8. A method according to claim 7, wherein in said sequences (SQ) of g integers are Hadamard sequences.

* * * * *